United States Patent [19]
Danner et al.

[11] Patent Number: 5,103,928
[45] Date of Patent: Apr. 14, 1992

[54] DRIVE SLIP CONTROLLING METHOD

[75] Inventors: Bernd Danner, Stuttgart; Erich Schindler, Unterueissach, both of Fed. Rep. of Germany

[73] Assignee: Mercedes-Benz AG, Fed. Rep. of Germany

[21] Appl. No.: 611,697

[22] Filed: Nov. 13, 1990

[30] Foreign Application Priority Data

Nov. 18, 1989 [DE] Fed. Rep. of Germany ....... 3938444

[51] Int. Cl.$^5$ .............................................. B60K 28/16
[52] U.S. Cl. .................................. 180/197; 364/426.01
[58] Field of Search ....................... 180/197, 178, 179; 364/426.02, 426.01

[56] References Cited

U.S. PATENT DOCUMENTS

| 4,886,140 | 12/1989 | Leiber et al. | 180/197 |
| 4,916,619 | 4/1990 | Walenty et al. | 364/426.02 |
| 4,961,146 | 10/1990 | Kajiwara | 180/179 |
| 4,962,570 | 10/1990 | Hosaka et al. | 180/197 |
| 4,985,838 | 1/1991 | Hashiguchi et al. | 180/197 |

Primary Examiner—Charles A. Marmor
Assistant Examiner—Kevin Hurley
Attorney, Agent, or Firm—Evenson, Wands, Edwards, Lenahan & McKeown

[57] ABSTRACT

A method for controlling drive slip permits the maximum drive torque which can be transmitted by the driven wheels to be determined and transmitted to a central control device of the internal combustion engine. On the basis of this transmitted value, the central control device determines how the setting parameters of the internal combustion engine have to be adjusted in order to avoid excessive drive slip. An interaction occurs between the drive slip control and further open-chain and feedback control devices which supply signals to the central control device of the internal combustion engine.

37 Claims, 4 Drawing Sheets

(6.1) $M_{add} = K_P \cdot \delta\beta - K_D \cdot \delta a - K_S \cdot \text{sign}(\delta\beta) \cdot \delta\beta \cdot \delta a$ (6.2) $M_{dr,max} = M_{dr,max} + M_{add}$

DRIVE SLIP CONTROLLING METHOD

BACKGROUND AND SUMMARY OF THE INVENTION

The present invention concerns a method for controlling drive slip, and more particularly, to a method used in a vehicle driven by an internal combustion engine whose setting parameters are centrally controlled and in which the actual slip of the vehicle's driven wheels is continually recorded by a calculating unit and compared with the required slip, such that, in the case where the actual slip of at least two driven wheels on different sides of the vehicle deviates from the required slip by a certain slip threshold value, a signal formed in the calculating unit is emitted to a central control unit. On the appearance of this signal, at least one setting parameter of the internal combustion engine is altered by the central control unit to reduce the engine torque transmitted from the internal combustion engine.

A method of the foregoing type, generally speaking that is, is disclosed in DE 32 24 254 A1. The slip of the driven wheels is determined in a calculating unit from wheel rotational speed signals. If an excessive slip occurs, the engine torque transmitted from the internal combustion engine is lowered by a reduction in the quantity of fuel injected. The degree of reduction is determined in the calculating unit and is transmitted to the injection valves of the internal combustion engine via a central control device of the internal combustion engine, which can for example be a Bosch "L-Jetronic" brand device. The degree of reduction then depends on the wheel slip occurring in such a way that when different threshold values of the slip are reached, greater reduction in the quantity of injected fuel takes place in steps.

A disadvantage of this method is that the adjustment of the setting parameters of the internal combustion engine is transmitted from the calculating unit. Only the end stages of the central control device are used to control the setting parameters. The adjustment of the setting parameters of the internal combustion engine is, in this case, only specified as a function of the slip of driven wheels without taking account of the operating conditions of the internal combustion engine, such as its temperature.

It is also known, as shown in DE 34 35 869 A1 and DE 37 11 913 A1, to cause an automatic gearbox to change up on the occurrence of slip at driven wheels. Action also is taken on the setting parameters of the internal combustion engine, in addition to changing up the automatic gearbox, in order to reduce the engine torque of the internal combustion engine. From the disclosure in DE 34 35 869 A1, it is known that action can be taken on the engine control and, simultaneously, the automatic gearbox can be changed up on every reduction of the drive torque. From the disclosure in DE 37 11 913 A1, it is known that the automatic gearbox can be changed up on every reduction of the drive torque and, in order to improve the behavior with time of the reduction of the drive torque, action can be taken on the engine control in order to reduce the engine torque transmitted until the gear-changing of the automatic gearbox has been concluded.

Disadvantages arise with these known drive slip control systems in that, on the occurrent of an excessive slip of driven wheels, the automatic gearbox is always changed up. Increased slip of the driven wheels can, however, also occur for a short period when, for example, the vehicle drives over a small iced area, e.g., when there is a short-term reduction of the friction coefficient $\mu$. Because this perturbation is only short-term, it is found desirable not to cause the automatic gearbox to change up immediately, particularly when the lower drive torque which can be transmitted because of the reduced friction coefficient $\mu$ can be achieved by reduction of the engine torque alone. In this situation, therefore, a superfluous gear-change of the automatic gearbox occurs, which leads to mechanical loading of the automatic gearbox because of this gear-change and, in addition, this gear-changing procedure leads to poor driving comfort.

It is also generally known to determine the resistance to travel and the force transmission between the tires and the roadway as disclosed in Zomotor, Adam; Fahrwerktechnik: Fahrverhalten; Wurzburg: Vogel, 1987; ISBN 3-8023-0774-7; pp. 17ff.

An object of the present invention is to achieve a method for controlling the drive slip in such a way that, in the case of a need to act on setting parameters of the internal combustion engine of a motor vehicle, this action takes into account insofar as possible, to take the way in which the engine torque transmitted from the internal combustion engine depends on a change to the setting parameters of the internal combustion engine due to the instantaneous operating condition of the internal combustion engine. In addition, the method should be as universally usable as possible and permit the simplest possible adaptation to changes in the internal combustion engine and/or the driving mechanism.

The present invention achieves those objects in a method in which the maximum drive torque which can be transmitted by the wheels of the motor vehicle is determined in a, calculating unit. A signal, which directly represents the determined maximum transmittable drive torque, is emitted from the calculating unit to the input of a central control device, and the central control unit is configured such that at least one setting parameter of the internal combustion engine is altered as a function of the signal representing the determined maximum transmittable drive torque to reduce the engine torque transmitted from the internal combustion engine.

Further advantages of the present invention relative to the known state-of-the-art comprise the fact that a simplified interaction of various components for controlling the different parameters is provided by allocating priorities to the output signals of these components so that no contradictory action by several of these components on setting parameters takes place. The priorities of the output signals of these components are determined by the importance of the components to the operational safety of the motor vehicle.

The method of the present invention is based on the fact that, when excessive slip occurs on at least two driven wheels on different sides of the vehicle, the maximum drive torque which can be transmitted between these driven wheels and the roadway surface is determined. The required torque to be transmitted from the internal combustion engine is then determined by taking account of the axle and gearbox transmission ratios. A required rotational speed of the internal combustion engine is derived from the dynamic wheel radius $R_{dyn}$, the motor vehicle speed $v_v$ and the axle and gearbox transmission ratios. This required rotational speed and the required torque are supplied to a central control device of the internal combustion engine which causes the actual rotational speed and the actual engine torque of the internal combustion engine to achieve these required values by adjusting the setting parameters of the internal combustion engine.

BRIEF DESCRIPTION OF THE DRAWINGS

These and other objects, features and advantages of the present invention will become more apparent from the following detailed description a presently preferred embodiment when taken in conjunction with the accompanying drawings wherein.

DETAILED DESCRIPTION OF THE DRAWINGS

Figure 1:
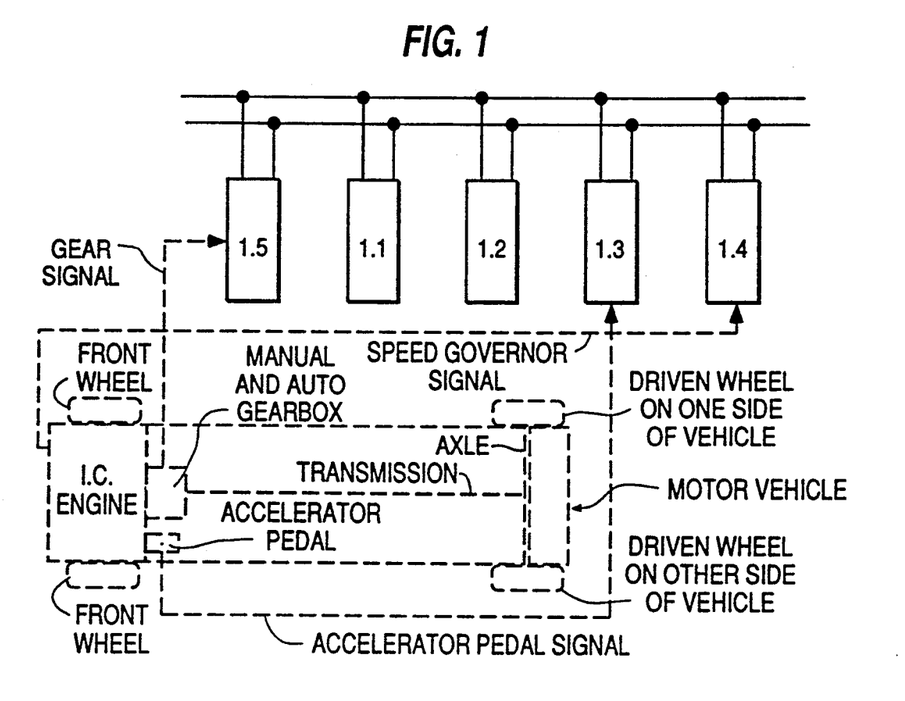
FIG. 1 is a schematic diagram of an arrangement of the calculating unit and the central control device in association with further control devices.

As seen in FIG. 1, a calculating unit 1.1 and a central control device 1.2 are connected to an analysis unit 1.3, to a further control device 1.4 and to an input/output unit 1.5 of an automatic gearbox. The analysis unit 1.3 is a driver's demand recognition unit which derives the required internal combustion engine torque demanded by the vehicle driver from, in particular, the position of the accelerator pedal depressed by the vehicle driver. It is directly possible to derive the required internal combustion engine torque demanded by the vehicle driver from the position of some other adjustment device operated by the vehicle driver rather than from the position of the accelerator pedal.

A speed governor is provided as the further control device 1.4. This speed governor is switched on by the vehicle driver when a certain required vehicle speed $vV_{req}$ has to be kept constant. This governor derives a required internal combustion engine torque from the actual vehicle speed $v_y$ because a change in the direction of a larger required internal combustion engine when a certain required vehicle speed $v_y$ has dropped below the required vehicle speed $vV_{req}$. A change in the direction of a smaller required internal combustion engine torque is correspondingly derived when the actual vehicle speed $v_y$ exceeds the required vehicle speed $vV_{req}$.

Because different adjustments to the required internal combustion engine torques can be specified by the analysis unit 1.3, by the control device 1.4 and by the calculating unit 1.1 to the central control device 1.2, the central control device 1.2 must allocate priorities to the adjustments to the required internal combustion engine torques transmitted from the analysis unit 1.3, the control device 1.4 and the calculating unit 1.1. Due to the importance of driving safety, the required internal combustion engine torque signal transmitted by the calculating unit 1.1 is given the maximum priority over the required internal combustion engine torque signal transmitted by the analysis unit 1.3, the latter having a higher priority than the required internal combustion engine torque transmitted by the control device 1.4. It is therefore possible for the vehicle driver to switch off the speed governor by operating the accelerator pedal and to specify the required internal combustion engine torque himself.

In addition, the calculating unit 1.1, the control device 1.4 and the analysis unit 1.3 are connected to an input/output unit 1.5 of an automatic gearbox so that a signal can be transmitted from the input/output unit 1.5 to the calculating unit 1.1, the control device 1.4 and the analysis unit 1.3. This signal represents the gear engaged in the automatic gearbox at the particular moment and hence the transmission ratio. At the same time, a gear-change signal can be supplied from the calculating unit 1.1 to the input/output unit 1.5, this signal causing the automatic gearbox to change up. This gear-change signal is supplied to the automatic gearbox whenever the maximum possible reduction in the engine torque from the internal combustion engine is not sufficient to cause a reduction of the drive torque to an amount which can be transmitted by the wheels of the motor vehicle. Similarly, in a vehicle with manual gear change, the vehicle driver is given an information signal in this case, and this signal causes him to engage a higher gear.

Figure 2:
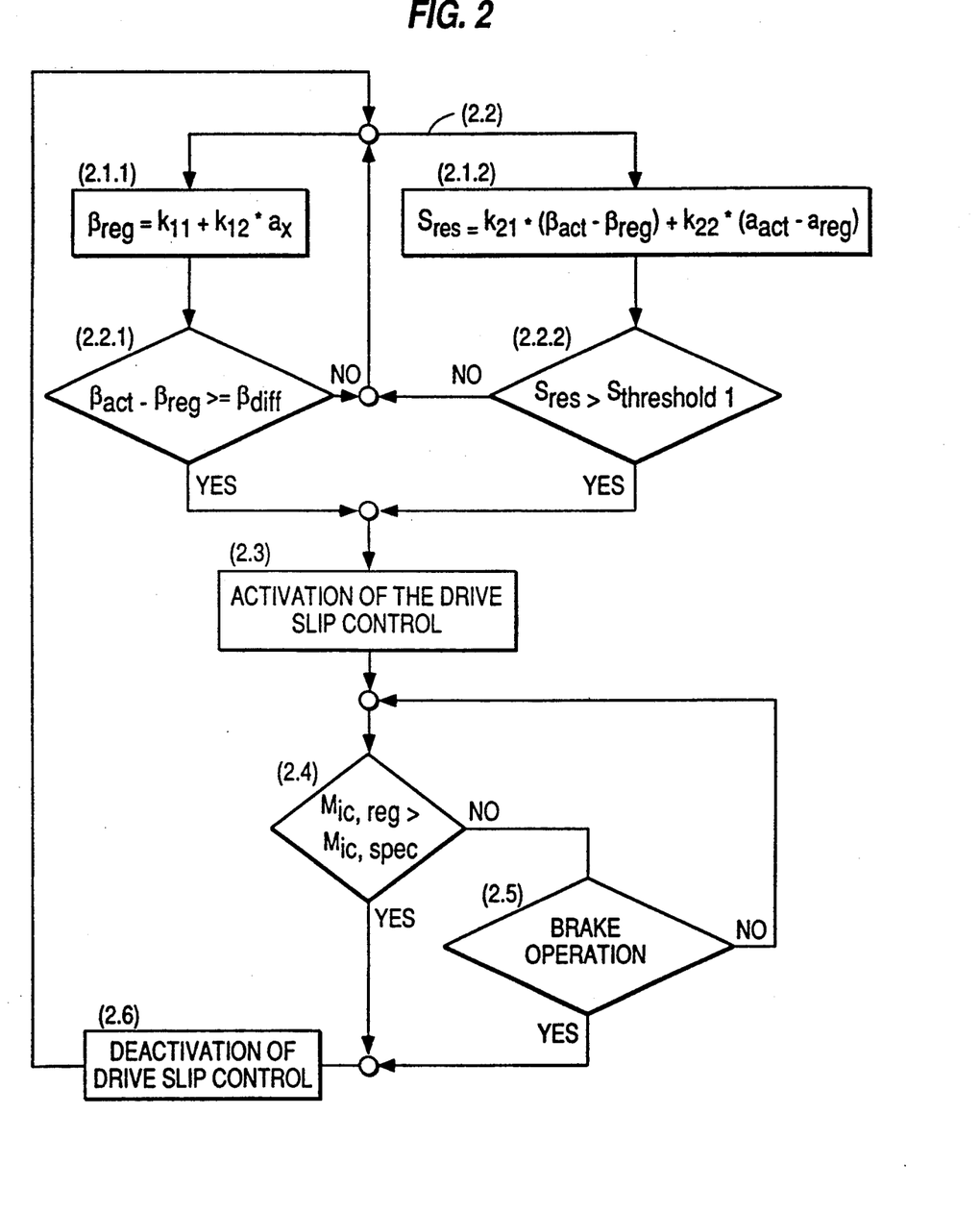
FIG. 2 is a flow diagram for activating and deactivating the drive slip control.

From the representation in FIG. 2, a check is made in a step (2.2), in the drive slip control system in accordance with the present invention, in order to see whether driven wheels on different sides of the vehicle have an unallowably high slip. The slip of the driven wheels can be determined by comparing the wheel rotational speeds of the driven wheels with a rotational speed corresponding to that of a wheel which is not driven. This rotational speed of a non-driven wheel can be calculated, in a vehicle with rear wheel drive, by defining the arithmetic average of the rotational speeds of the front wheels as the rotational speed of the non-driven wheels. In order to establish an unallowably high slip, the slip $\beta_{act}$ actually determined can first be compared with a required slip $\beta_{req}$ for the wheel as the criterion. This required slip $\beta_{req}$ can be specified as a constant. In an advantageous embodiment, this required slip $\beta_{req}$ is specified in a step (2.1.1) as a function of the vehicle longitudinal acceleration $a_x$. This function is linear and can be determined from the equation:

$$\beta_{req} = k_{11} + K_{12} \cdot a_x.$$

The coefficient $k_{11}$ is of an order of value of approximately 0.01 and the coefficient $k_{12}$ is of an order of value of approximately 0.05 s²/m.

If it is found in the step (2.2.1) that the slip $\beta_{act}$ actually determined differs by a certain amount $\beta_{diff}$ from the required $\beta_{req}$, the drive slip control is activated in a step (2.3). This certain amount $\beta_{diff}$ can be of an order of value of, for example, 0.06. A particularly early recognition of an unallowably high slip can be achieved, in a particularly advantageous embodiment, by comparing the actual acceleration $a_{act}$ of the relevant driven wheel given by the derivative with respect to time of the wheel speed and the dynamic wheel radius $R_{dyn}$, with the required acceleration $a_{req}$ given by the derivative with respect to time of the calculated wheel speed and the dynamic wheel radius of the non-driven wheel. It is preferable to determine the difference between these two accelerations.

A resulting criterion $S_{res}$ can then be obtained for the recognition of an unallowably high slip in a step (2.1.2) by associating the two criteria, the relationship being:

$$S_{res} = k_{21} * (\beta_{act} - \beta_{req}) + k_{22} * (a_{act} - a_{req}).$$

The constant $k_{21}$ in the above expression is of an order of value of approximately 1 and the constant $k_{22}$ is of an order of value of approximately 0.1 s$^2$/m. If it is found, in a step (2.2.2), that this value $S_{res}$ exceeds a certain amount, $S_{threshold1}$ (see FIG. 3), the drive slip control is activated in a step (2.3). This amount $S_{threshold1}$ can be of an order of value of approximately 0.06.

Deactivation of the drive slip control can take place in a step (2.6) by determining in a step (2.4) that, on the basis of the determined maximum drive torque which can be transmitted and the axle and gearbox transmission ratios, the required torque to be transmitted from the internal combustion engine $M_{ic,req}$ exceeds the required torque of the internal combustion engine $M_{IC,spec}$, derived from the position of the accelerator pedal by the vehicle driver and/or by determining in a step (2.5) that the vehicle driver has operated the vehicle brake system.

Using this drive slip control system, it is possible to brake these wheels to reduce the drive torque acting on these wheels when only driven wheels of one vehicle side exhibit an unallowably high slip. It is then desirable to monitor the temperature of these brakes. If this temperature reaches a critical value, a signal is emitted, in an advantageous embodiment of the calculating unit 1.1, to the central control device 1.2, which signal represents the maximum drive torque which can be transmitted by these driven wheels.

Figure 3:
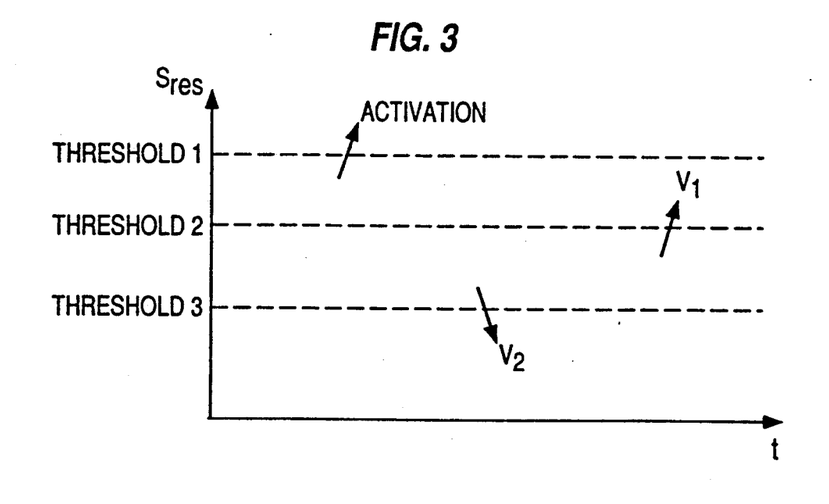
FIG. 3 is a representation of the slip threshold values for actuating the drive slip control.

From the representation in FIG. 3, the maximum drive torque which can be transmitted is determined as a function of the magnitude of the resulting criterion $S_{res}$ in accordance with two different methods $V_1$ and $V_2$. If the slip criterion has a value $S_{res}$ greater than $S_{threshold1}$, the drive slip control is activated. The maximum drive torque which can be transmitted is then determined in accordance with the method $V_1$ shown in FIG. 4. In this method, a maximum drive torque which can be transmitted is determined, based on the torque $M_{ax}$ arising from vehicle data, by subtracting from this torque $M_{ax}$ a slip-dependent reduction $M_{red}$ of this torque.

If the value of the slip criterion $S_{res}$ is less than a threshold $S_{threshold3}$, the maximum drive torque which can be transmitted is determined according to the method $V_2$. In contrast to the method $V_1$, this method $V_2$ leads to a more rapid restoration of the calculated maximum drive torque than does the method $V_1$. If the value of the slip criterion $S_{res}$ then again exceeds a threshold $S_{threshold2}$, the maximum drive torque which can be transmitted is again calculated in accordance with the method $V_1$. The result is, therefore, a two-point switch with hysteresis. The threshold $S_{threshold3}$ can be of the order of value of approximately 0.01 and the threshold $S_{threshold2}$ can be of the order of value of approximately 0.03.

Figure 4:
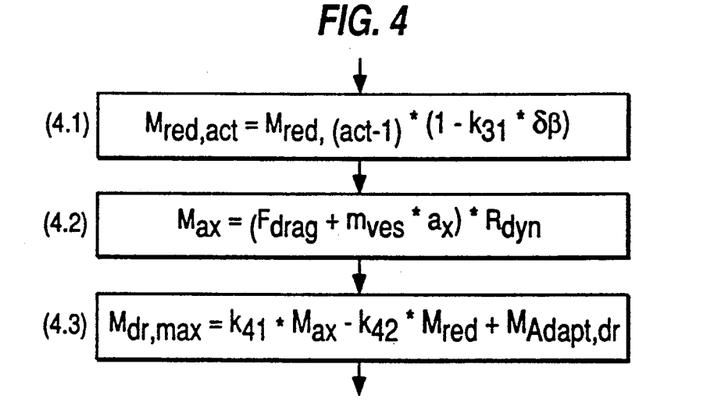
FIG. 4 is a flow diagram of a first method for determining a first contribution to the maximum drive torque which can be transmitted.

A description of the method $V_1$ now follows corresponding to the representation in FIG. 4. If pulsed recording takes place and subsequent processing of the wheel rotational speeds, the slip-dependent reduction $M_{red,act}$ of the torque in the current pulse step can be calculated, from the slip-dependent reduction $M_{red,(act-1)}$ of the torque of the preceding pulse step, in a step 4.1 in accordance with the following equation:

$$M_{red,act} = M_{red,(act-1)} * (1 - k_{31} * \delta\beta).$$

The parameter $\delta\beta$ is then the slip difference between the required value of the slip $\beta_{req}$ and the slip $\beta_{act}$ of the driven wheels of the vehicle. The constant $k_{31}$ has a value of approximately 2. The initial value $M_{red,1}$ is found by determining, in a first pulse step, the maximum drive torque which can be transmitted without taking into account the torque $M_{red}$. From the second pulse step, therefore, a value $M_{red,(act-1)}$ is therefore available recursively.

The torque $M_{ax}$ obtainable from the vehicle data is determined in a step 4.2 from the following equation:

$$M_{ax} = (F_{drag} + m_{veh} * a_x) * r_{dyn}.$$

In this equation, $F_{drag}$ represents the rolling and aerodynamic resistances of the motor vehicle, $m_{veh}$ is the empty weight, $a_x$ is the longitudinal acceleration and $R_{dyn}$ is the dynamic wheel radius. Because the empty weight is used for the mass of the motor vehicle, a higher drive torque can, in reality, be transmitted than that determined by the use of this equation in method $V_1$.

This is taken into account in determining the required torque of the internal combustion engine, after the conversion of the drive torque to this required torque, by adding a torque $M_{adapt}$ in a step 4.3. This torque can have a starting value of approximately 80 Nm. This value can be converted into a corresponding drive torque $M_{adapt,dr}$ in accordance with the axle and gearbox transmission ratios. If switching occurs between these two methods $V_1$ and $V_2$, the value of this torque $M_{adapt,dr}$ is altered in such a way that there is a steady transition during this switching operation between the maximum drive torques which can be transmitted, determined by the two methods $V_1$ and $V_2$.

In the method $V_1$ shown in FIG. 4, therefore, the maximum drive torque which can be transmitted $M_{dr,max}$ is determined from the equation:

$$M_{dr,max} = k_{41} * M_{ax} + M_{adapt,dr} - k_{42} * M_{red},$$

where the constant $k_{41}$ can be on the order of value of approximately 1 and the constant $k_{42}$ can be of the order of value of approximately 2.

Figure 5:
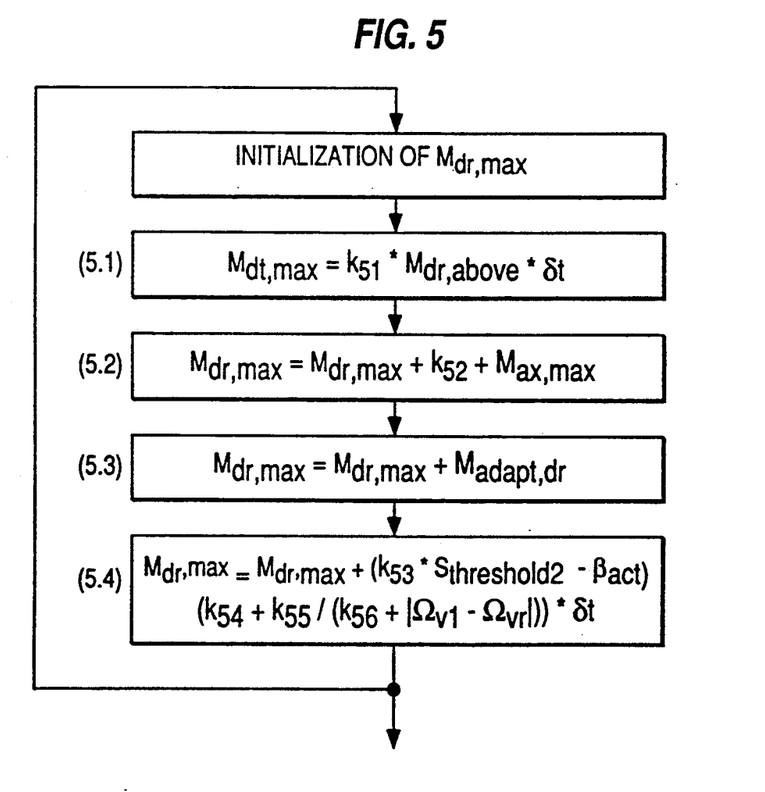
FIG. 5 is a flow diagram of a second method for determining the first contribution to the maximum drive torque which can be transmitted.

In a particularly advantageous embodiment, the maximum possible drive torque is determined by the method $V_2$, in accordance with the representation of FIG. 5, when the drive slip control is activated and the slip of the driven wheels decreases. The objective, when the friction coefficients increase (derived from the fact that the slip decreases), is to carry out a determination of the maximum drive torque which can be transmitted which is as near as possible to the actual conditions.

The maximum drive torque which can be transmitted is therefore increased in a step 5.1 in the form of a ramp with respect to time, the slope of this ramp varying with the maximum drive torque $M_{dr,tr}$ which can be transmitted calculated at the transition from the method $V_1$ to the method $V_2$. This dependence is preferably linear. The calculation of the maximum drive torque which can be transmitted by method $V_2$ also includes, in a step 5.2, the maximum torque $M_{ax,max}$ occurring during the calculation of the maximum drive torque which can be transmitted. This follows from the vehicle data in a manner analogous to the explanation of the determination of the torque $M_{ax}$ in the description of FIG. 4.

Also added, in step 5.3, is a parameter $M_{adapt,dr}$ which accepts an order of value such that a steady transition takes place during the transition from the calculation of the maximum drive torque which can be transmitted in accordance with the method $V_1$ to the calculation of the maximum drive torque which can be transmitted in accordance with the method $V_2$.

A step 5.4 adds a torque $M_{time}$, which effects an increase with time of the determined maximum transmittable drive torque, the increase being a function of the magnitude of the actual slip $\beta_{act}$ and of the radius of curvature and the speed during travel around a curve. This torque $M_{time}$ is given by:

$$M_{time} = (k_{53} * S_{threshold2} - \beta_{act}) * (k_{54} + k_{55}/(k_{56} + |\Omega_{fl} - \Omega_{fr}|)) * \delta t.$$

The constant $k_{53}$ can be of the order of value of approximately 1.5, the constant $k_{54}$ of the order of value of approximately 10,000 NM/s, the constant $k_{55}$ of the order of value of approximately 30,000 Nm/s² and the constant $k_{65}$ of the order of value of approximately 1,000/s. The parameters $\Omega_{fl}$ and $\Omega_{fr}$ designate the rotational speeds of the non-driven left-hand and right-hand front wheels.

The calculation of the maximum drive torque which can be transmitted in accordance with the method $V_2$ is therefore given by the equation:

$$M_{dr,max} = k_{51} * M_{dr,tr} * \delta t + k_{52} * M_{ax,max} + M_{adapt,dr} + M_{time}.$$

The constant $k_{51}$ can be of the order of value of approximately 0.2*1/s and the constant $k_{52}$ be of the order of value of approximately 1. The parameter $\delta t$ represents the time interval which has elapsed since the transition, from the method $V_1$ to the method $V_2$, of the calculation of the maximum drive torque which can be transmitted.

Figure 6:
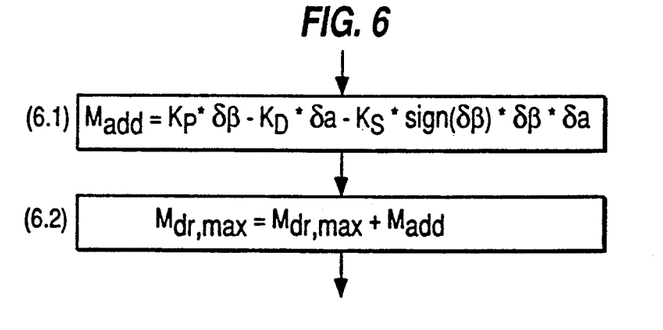
FIG. 6 is a flow diagram of a method for determining a second contribution to the maximum torque which can be transmitted.

It has also been found desirable to determine, in a step 6.1, a torque $M_{add}$ (as shown in the representation of FIG. 6) when calculating the maximum drive torque which can be transmitted according to one of the methods $V_1$ or $V_2$. This torque can be calculated from the following equation:

$$M_{add} = K_P * \delta\beta - K_D * \delta a - K_S * \text{sign}(\delta\beta) * \delta\beta * \delta a.$$

The constants have approximately the following values:

$$K_p \approx 6000 \text{ Nm}; K_D \approx 30 \text{ Ns}^2; K_S \approx 20 \text{ Ns}^2.$$

The parameter $\delta\beta$ is the difference between the required slip $\beta_{req}$ and the actual slip $\beta_{act}$; and the parameter $\delta a$ is the difference between the acceleration resulting from the peripheral velocity of the driven wheel with the highest rotational speed $\Omega_{high}$ and the vehicle acceleration $a_x$, which is determined from at least one of the rotational speeds of the non-driven wheels. When the rotational speeds are used, for example, the arithmetic average of these rotational speeds is used as the reference rotational speed $\Omega_{ref}$. In consequence:

$$S\beta = \beta_{req} - \beta_{act},$$

$$Sa = R_{dyn} * (d\Omega/dt_{high} - d\Omega/dt_{ref}).$$

In a step 6.2, this particular torque $M_{add}$ is added to the maximum drive torque which can be transmitted, as previously determined in one of the methods $V_1$ or $V_2$ in order finally to obtain the maximum drive torque which can be transmitted.

Figure 7:
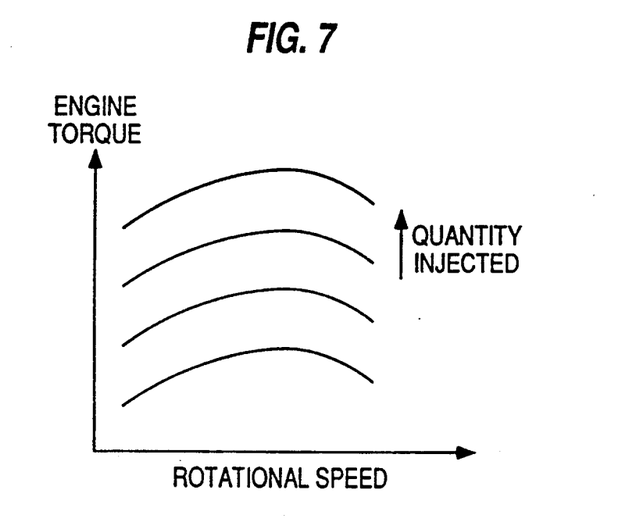
FIG. 7 is a characteristic field of the engine torque plotted against rotational speed, with the fuel quantities injected as a parameter, for the optimum operating temperature of the internal combustion engine.

FIG. 7 shows a characteristic field of the engine torque plotted against rotational speed with, as a parameter, the fuel quantity injected at the optimum operating temperature of the internal combustion engine. From this characteristic field, it is possible to allocate a certain characteristic line to a specified rotational speed and a specified engine torque and from this, the quantity of fuel to be injected can be determined from the parameter.

Figure 8:
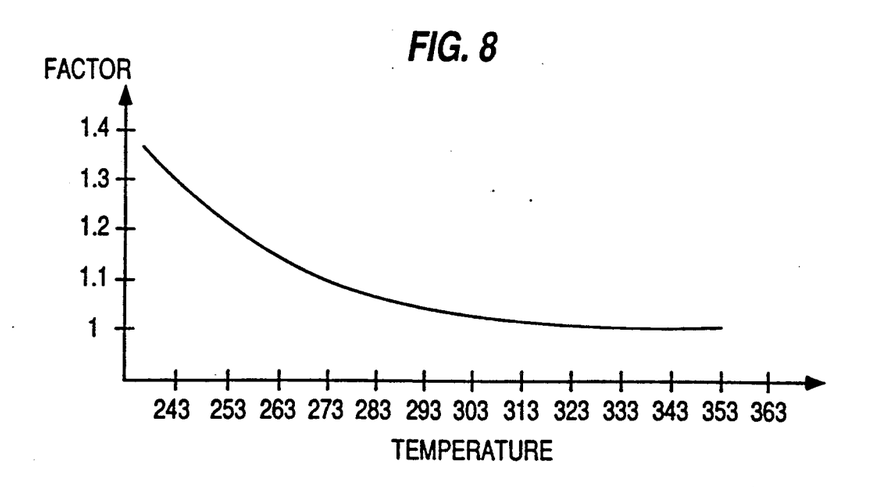
FIG. 8 is a characteristic line which gives the multiplication factor for the quantity of fuel to be injected plotted against the operating temperature of the internal combustion engine in order to generate a constant engine torque at various operating temperatures.

Different operating temperatures of the internal combustion engine can be taken into account by multiplying the quantity of fuel to be injected, determined from the characteristic field of FIG. 7, by a multiplication factor, given for example by the characteristic line of FIG. 8. This gives the quantity of fuel to be injected as a function of the operating temperature of the internal combustion engine in order to generate a constant engine torque at various operating temperatures based on the oil temperature and/or the coolant temperature.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for controlling slip of driven wheels of a motor vehicle having an internal combustion engine comprising the steps of:
    driving the vehicle by said internal combustion engine whose setting parameters are controlled by a central control device;
    continually recording the actual slip of the driven wheels by a calculating unit and comparing the actual slip with a required slip;
    emitting a signal formed in the calculating unit to the central control device when the actual slip of at least two driven wheels on different sides of the vehicle deviates from the required slip by a certain slip threshold value;
    at the appearance of the signal, altering at least one of said setting parameters of the internal combustion engine by the central control unit such that a reduction of the engine torque transmitted from the internal combustion engine takes place;
    determining the maximum drive torque which can be transmitted by the driven wheels of the motor vehicle in the calculating unit;
    emitting a signal directly representative of the determined maximum transmittable drive torque determined from the calculating unit to an input of the central control device; and altering at least one of the setting parameters of the internal combustion engine as a function of the signal representing the determined maximum transmittable drive torque determined such that a reduction of the engine torque transmitted from the internal combustion engine takes place.

2. The method according to claim 1, wherein the maximum drive torque which can be transmitted by the driven wheels is determined by subtracting a first torque which depends on the degree of slip from a second torque which is determined from longitudinal acceleration, vehicle mass, rolling and aerodynamic resistance forces and dynamic wheel radius.

3. The method according to claim 2, wherein the first torque depends linearly on the degree of slip.

4. The method according to claim 1, wherein an assessment takes place of actually determined slip compared with a required slip for the driven wheels and of an actually determined wheel acceleration compared with a required vehicle longitudinal acceleration for the driven wheels corresponding to the vehicle acceleration in order to determine a slip criterion for activating control of the slip of the driven wheels.

5. The method according to claim 4, wherein the maximum drive torque which can be transmitted by the driven wheels is determined by subtracting a first torque which depends on the degree of slip from a second torque which is determined from longitudinal acceleration, vehicle mass, rolling and aerodynamic resistance forces and dynamic wheel radius.

6. The method according to claim 6, wherein the first torque depends linearly on the degree of slip.

7. The method according to claim 4, wherein the required slip is determined as a function of the vehicle longitudinal acceleration.

8. The method according to claim 2, wherein when the slip of the driven wheels is different from certain slip threshold values,
the maximum drive torque which can be transmitted by the driven wheels is determined such that:
controlling of the slip of the driven wheels is activated when slip criterion exceeds one of the slip threshold values, and the maximum drive torque which can be transmitted by the driven wheels then is determined in accordance with one method, and the maximum drive torque which can be transmitted by the driven wheels is determined in accordance with another method when the slip criterion is less than another of the slip threshold values, the maximum drive torque which can be transmitted by the driven wheels determined according to the another method rising more rapidly than the maximum torque which can be transmitted determined in accordance with the one method when the slip criterion is less than the another slip threshold value.

9. The method according to claim 8, wherein the maximum drive torque which can be transmitted is determined by subtracting a first torque which depends on the degree of slip from a second torque which is determined from the longitudinal acceleration, the vehicle mass, the rolling and aerodynamic resistance forces and the dynamic wheel radius.

10. The method according to claim 9, wherein the first torque depends linearly on the degree of slip.

11. The method according to claim 10, wherein an assessment takes place of actually determined slip compared with a required slip for the driven wheels and of an actually determined wheel acceleration compared with a required vehicle longitudinal acceleration for the driven wheels corresponding to the vehicle acceleration in order to determine a slip criterion for activating control of the slip of the driven wheels.

12. The method according to claim 11, wherein the required slip is determined as a function of the vehicle longitudinal acceleration.

13. The method according to claim 8, wherein a determination of the maximum transmittable drive torque takes place in accordance with the another method in that the maximum transmittable drive torque determined consists at least partially of a torque which increases with time in a ramp form.

14. The method according to claim 13, wherein the ramp-like rise in the maximum transmittable drive torque depends linearly on a value at a point where the determination of the maximum transmittable drive torque switches from the one method to the another method.

15. The method according to claim 13, wherein the ramp-like rise in the maximum transmittable drive torque depends on a difference in the actual slip at a third slip threshold value and on a radius of curvature and a speed when traveling round a curve.

16. The method according to claim 14, wherein the ramp-like rise in the maximum transmittable drive torque depends on a difference in the actual slip at a third slip threshold value and on a radius of curvature and a speed when traveling round a curve.

17. The method according to claim 8, wherein the maximum transmittable drive torque determined in accordance with the another method partially comprises a torque which is determined from longitudinal acceleration, vehicle mass, rolling and aerodynamic resistance forces and dynamic wheel radius.

18. The method according to claim 17, wherein a determination of the maximum transmittable drive torque takes place in accordance with the another method in that the maximum transmittable drive torque determined consists at least partially of a torque which increases with time in a ramp form.

19. The method according to claim 18, wherein the ramp-like rise in the maximum transmittable drive torque depends linearly on a value at a point where the determination of the maximum transmittable drive torque switches from the one method to the another method.

20. The method according to claim 19, wherein the ramp-like rise in the maximum transmittable drive torque depends on a difference in the actual slip at a third slip threshold value and on a radius of curvature and a speed when traveling round a curve.

21. The method according to claim 8, wherein the determination of the maximum transmittable drive torque, when a third slip threshold value is again exceeded by the slip criterion takes place in accordance with the one method if the slip criterion has previously fallen below the another slip threshold value, the value of the third slip threshold value between the values for the one and the another slip threshold values.

22. The method according to claim 21, wherein a determination of the maximum transmittable drive torque takes place in accordance with the another method in that the maximum transmittable drive torque determined consists at least partially of a torque which increases with time in a ramp form.

23. The method according to claim 22, wherein the ramp-like rise in the maximum transmittable drive torque depends linearly on a value at a point where the determination of the maximum transmittable drive torque switches from the one method to the another method.

24. The method according to claim 23, wherein the ramp-like rise in the maximum transmittable drive torque depends on a difference in the actual slip at a third slip threshold value and on a radius of curvature and a speed when traveling round a curve.

25. The method according to claim 24, wherein the maximum transmittable drive torque determined in accordance with the another method partially comprises a torque which is determined from longitudinal acceleration, vehicle mass, rolling and aerodynamic resistance forces and dynamic wheel radius.

26. The method according to claim 8, wherein, in relation to a transmission ratio arising from an axle and gearbox transmission ratio, a required torque for torque of the internal combustion engine is determined from the determined maximum transmittable drive torque, and to the required torque is added another torque whose value is altered at each point where the determination of the maximum transmittable drive torque switches between the one method and the another method, such that an overall steady variation of the maximum transmittable drive torque determined is obtained.

27. The method according to claim 1, wherein an overall maximum transmittable drive torque is determined by adding a torque to a previously determined maximum transmittable drive torque, which added torque takes account of deviation of the slip actually present from the required slip and the deviation of wheel acceleration from the required acceleration such that account is taken of whether actually present slip of the corresponding wheel corresponds to a value which is located on one of a stable and unstable branch of a slip curve characterization.

28. The method according to claim 8, wherein, when the one slip threshold value of the slip criterion of at least one of the driven wheels on only one side of the vehicle is exceeded, operation of brakes of the driven wheels takes place such that the actually present slip of the driven wheels corresponds to the required slip.

29. The method according to claim 28, wherein, on reaching a critical loading of the brakes of the driven wheels where the operation has taken place, a signal representative of the maximum drive torque which can be transmitted by the driven wheels is emitted from the calculating unit to the central control device.

30. The method according to claim 1, wherein a gear-changing signal causing a gearbox of the vehicle to change to a higher gear is emitted from the control unit to an input/output unit of an automatic gearbox in the vehicle when torque required to be transmitted from the internal combustion engine is so low that the required torque is about equal to torque made available by the internal combustion engine at idle.

31. The method according to claim 30, wherein the gear-changing signal to the input/output unit causes engagement of a gear of the automatic gearbox for which, in dependence upon the maximum transmittable drive torque and to a gearbox transmission, the required torque to be transmitted by the internal combustion engine is above the torque made available by the internal combustion engine at idle.

32. The method according to claim 1, wherein an information signal is emitted from the calculating unit to a vehicle driver to recommend engaging a higher gear in a manual gearbox of the vehicle when the torque required to be transmitted by the internal combustion engine is at a value that the required torque to be transmitted is about equal to the engine torque made available by the internal combustion engine at idle.

33. The method according to claim 1, wherein an analysis unit causes a signal to be generated from a device operated by a vehicle driver, which signal corresponds directly to torque required from the internal combustion engine and which signal is supplied to the central control device of the internal combustion engine.

34. The method according to claim 33, wherein the signal transmitted from the calculating unit to the central control device of the internal combustion engine has priority over the signal transmitted from the analysis unit to the central control device as long as the signal transmitted from the analysis unit to the central control device represents a larger required internal combustion engine torque than the signal transmitted from the calculating unit to the central control device of the internal combustion engine.

35. The method according to claim 1, wherein a signal is transmitted from a control apparatus, which is configured to keep vehicle speed at a constant value, to the central control device, which signal directly represents torque required to be transmitted by the internal combustion engine in order to maintain the vehicle speed.

36. The method according to claim 35, wherein a signal transmitted from the control apparatus to the central control device has a lower priority than a second signal transmitted from an analysis unit to the central control device which corresponds to a required from the internal combustion engine upon operation a the vehicle driver of a device analyzed by the analysis unit.

37. The method according to claim 1, wherein an operating temperature is analyzed in the central control device of the internal combustion engine that, as a function of deviation of the operating temperature from a required operating temperature, an increase in fuel quantity to be injected, relative to injection for a specified rotational speed, is selected in order to achieve an engine torque specified at the required operating temperature.

* * * * *